United States Patent
Peri

(10) Patent No.: US 10,866,652 B2
(45) Date of Patent: Dec. 15, 2020

(54) SYSTEM AND METHOD FOR DISTRIBUTED DEVICE TRACKING

(71) Applicant: Samsung Electronics Co., Ltd, Suwon-si (KR)

(72) Inventor: Christopher Peri, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 26 days.

(21) Appl. No.: 16/171,281

(22) Filed: Oct. 25, 2018

(65) Prior Publication Data
US 2019/0146598 A1 May 16, 2019

Related U.S. Application Data

(60) Provisional application No. 62/585,276, filed on Nov. 13, 2017.

(51) Int. Cl.
*G06F 3/0346* (2013.01)
*G06F 3/01* (2006.01)

(52) U.S. Cl.
CPC ............ *G06F 3/0346* (2013.01); *G06F 3/012* (2013.01); *G06F 3/014* (2013.01); *G06F 3/017* (2013.01)

(58) Field of Classification Search
CPC ........ G06F 3/0346; G06F 3/012; G06F 3/017; G06F 3/014
See application file for complete search history.

(56) References Cited

U.S. PATENT DOCUMENTS

| 9,067,097 | B2 | 6/2015 | Lane et al. |
| 9,649,558 | B2 | 5/2017 | Stafford et al. |
| 2004/0128012 | A1 | 7/2004 | Lin |
| 2011/0285622 | A1 | 11/2011 | Marti et al. |
| 2014/0125577 | A1 | 5/2014 | Hoang et al. |

(Continued)

FOREIGN PATENT DOCUMENTS

| CN | 104127187 B | 4/2017 |
| JP | 2012068060 A | 4/2012 |

(Continued)

OTHER PUBLICATIONS

ISA/KR, "International Search Report and Written Opinion of the International Searching Authority," Application No. PCT/KR2018-013734, dated Apr. 8, 2019, 9 pages.

(Continued)

*Primary Examiner* — Ibrahim A Khan

(57) ABSTRACT

A system and method enable an electronic device to determine six-degree of freedom (6DOF) of a hand-held controller. The device includes one or more tracking devices and a processor. The one or more tracking devices are configured to indicate a first three-degree of freedom (3DOF) orientation information regarding an orientation tracker device, and indicate a second 3DOF orientation information regarding the hand-held controller. The processor is configured to determine a six-degree of freedom (6DOF) orientation information of the hand-held controller as a function of the first 3DOF orientation information and the second 3DOF orientation information, wherein the orientation tracker device is different than the hand-held controller.

20 Claims, 8 Drawing Sheets

(56) References Cited

U.S. PATENT DOCUMENTS

| | | | |
|---|---|---|---|
| 2014/0176439 A1 | 6/2014 | Keller et al. | |
| 2015/0054630 A1 | 2/2015 | Xu et al. | |
| 2016/0033768 A1 | 2/2016 | Pedrotti et al. | |
| 2016/0110012 A1 | 4/2016 | Yim et al. | |
| 2017/0011553 A1 | 1/2017 | Chen et al. | |
| 2017/0060266 A1 | 3/2017 | Gao et al. | |
| 2017/0154471 A1 | 6/2017 | Woo et al. | |
| 2017/0205903 A1 | 7/2017 | Miller et al. | |
| 2017/0308165 A1 | 10/2017 | Erivantcev et al. | |
| 2017/0316762 A1 | 11/2017 | El-Ghoroury | |
| 2018/0052517 A1 | 2/2018 | Bulgarelli et al. | |
| 2018/0114364 A1* | 4/2018 | McPhee | G06F 11/08 |
| 2018/0285636 A1* | 10/2018 | Fei | G06K 9/00375 |
| 2019/0033988 A1* | 1/2019 | Hesch | G06F 3/03547 |
| 2019/0113966 A1* | 4/2019 | Connellan | G01S 5/0294 |
| 2019/0291277 A1* | 9/2019 | Oleynik | B25J 9/163 |

FOREIGN PATENT DOCUMENTS

| | | | |
|---|---|---|---|
| JP | 2017533480 A | 11/2017 | |
| KR | 10-2016-0045269 A | 4/2016 | |
| WO | 03077101 A2 | 9/2003 | |
| WO | 2009059716 A1 | 5/2009 | |
| WO | 2017061890 A1 | 4/2017 | |

OTHER PUBLICATIONS

Supplementary European Search Report in connection with European Application No. 18876902.0 dated Jul. 31, 2020, 9 pages.

\* cited by examiner

SYSTEM AND METHOD FOR DISTRIBUTED DEVICE TRACKING

CROSS-REFERENCE TO RELATED APPLICATION(S) AND CLAIM OF PRIORITY

This application claims priority under 35 U.S.C. § 119(e) to U.S. Provisional Patent Application No. 62/585,276 filed on Nov. 13, 2017 and entitled "SYSTEM AND METHOD FOR DISTRIBUTED DEVICE TRACKING". The above-identified provisional patent application is hereby incorporated by reference in its entirety.

TECHNICAL FIELD

This disclosure relates generally to optical display systems. More specifically, this disclosure relates to tracking hand held objects based on information from target tracking or degree of freedom tracking, or a combination thereof.

BACKGROUND

Augmented reality (AR) glasses, Virtual Reality (VR) headsets, and Head Mounted Display (HMD) systems are a growing market. Additionally, the tracking of hand held electronic devices (HHD) by an external reference, such as a display sensor in an HMD or other device, often is utilized. Due to the movement speed of the HHD, the external reference requires a high frame-rate for accuracy. The use of a high-frame rate further requires additional computational resources and additional electrical power.

SUMMARY

This disclosure provides a system and method for tracking hand held objects based on information from focal point tracking or gaze tracking, or both, such as for use a head mounted display system.

In a first embodiment, a device is provided. The device includes one or more tracking devices and a processor. The one or more tracking devices are configured to indicate a first three-degree of freedom (3DOF) orientation information regarding an orientation tracker device, and indicate a second 3DOF orientation information regarding a first electronic device. The processor is configured to determine a six-degree of freedom (6DOF) orientation information of the first electronic device as a function of the first 3DOF orientation information and the second 3DOF orientation information, wherein the orientation tracker device is separate from the first electronic device.

In a second embodiment, a method is provided. The method includes identifying, a first three-degree of freedom (3DOF) orientation information regarding an orientation tracker device. The method also includes identifying a second 3DOF orientation information regarding a first electronic device. The method also includes determining a six-degree of freedom (6DOF) orientation information of the first electronic device as a function of the first 3DOF orientation information and the second 3DOF orientation information, wherein the orientation tracker device is separate from the first electronic device.

In a third embodiment, a non-transitory computer readable medium configured to store a plurality of instructions is provided. The plurality of instructions, when executed by a processor, are configured to cause the processor to, obtain, from an orientation tracker coupled to a first body part of a user, a first three-degree of freedom (3DOF) orientation information regarding the orientation tracker; obtain, from a first electronic device, a second 3DOF orientation information regarding the first electronic device; and determine a six-degree of freedom (6DOF) orientation information of the first electronic device as a function of the first 3DOF orientation information and the second 3DOF orientation information.

In a fourth embodiment, a device is provided. The device includes a mount and an orientation tracker. The an orientation tracker is configured to indicate six-degree of freedom (6DOF) orientation information of a first electronic device, the orientation tracker comprising one or more tracking devices configured to identify a three-degree of freedom (3DOF) orientation of the device.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used herein, the terms "have," "may have," "include," "may include," "can have," or "can include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and do not limit the components. These terms are only used to distinguish one component from another. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts.

For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

The terms as used herein are provided merely to describe some embodiments thereof, but not to limit the scope of other embodiments of the present disclosure. It is to be understood that the singular forms "a," "'an," and "the" include plural references unless the context clearly dictates otherwise. All terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a PDA (personal digital assistant), a portable multimedia player (PMP), an MP3 player, a mobile medical device, a camera, or a wearable device (e.g., smart glasses, a head-mounted device (HMD), electronic clothes, an electronic bracelet, an electronic necklace, an electronic accessory, an electronic tattoo, a smart mirror, or a smart watch).

Definitions for other certain words and phrases are provided throughout this patent document. Those of ordinary skill in the art should understand that in many if not most instances, such definitions apply to prior as well as future uses of such defined words and phrases.

According to embodiments of the present disclosure, the electronic device can be a smart home appliance. Examples of the smart home appliance can include at least one of a television, a digital video disk (DVD) player, an audio player, a refrigerator, an air conditioner, a vacuum cleaner, an oven, a microwave oven, a washer, a dryer, an air purifier, a set-top box, a home automation control panel, a security control panel, a TV box (e.g., Samsung HomeSync™ APPLE TV™, or GOOGLE TV™), a gaming console (XBOX™, PLAYSTATION™), an electronic dictionary, an electronic key, a camcorder, or an electronic picture frame.

According to certain embodiments of the present disclosure, examples of the electronic device can include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, automatic teller's machines (ATMs), point of sales (POS) devices, or Internet of Things devices (e.g., a bulb, various sensors, an electric or gas meter, a sprinkler, a fire alarm, a thermostat, a street light, a toaster, fitness equipment, a hot water tank, a heater, or a boiler).

According to certain embodiments of the disclosure, the electronic device can be at least one of a part of a piece of furniture or building/structure, an electronic board, an electronic signature receiving device, a projector, or various measurement devices (e.g., devices for measuring water, electricity, gas, or electromagnetic waves).

According to embodiments of the present disclosure, the electronic device is one or a combination of the above-listed devices. According to embodiments of the present disclosure, the electronic device is a flexible electronic device. The electronic device disclosed herein is not limited to the above-listed devices, and can include new electronic devices depending on the development of technology.

As used herein, the term "user" may denote a human or another device (e.g., an artificial intelligent electronic device) using the electronic device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 9, discussed below, and the various embodiments used to describe the principles of this disclosure in this patent document are by way of illustration only and should not be construed in any way to limit the scope of the disclosure. Those skilled in the art will understand that the principles of this disclosure can be implemented in any suitably arranged wireless communication system.

Figure 1:
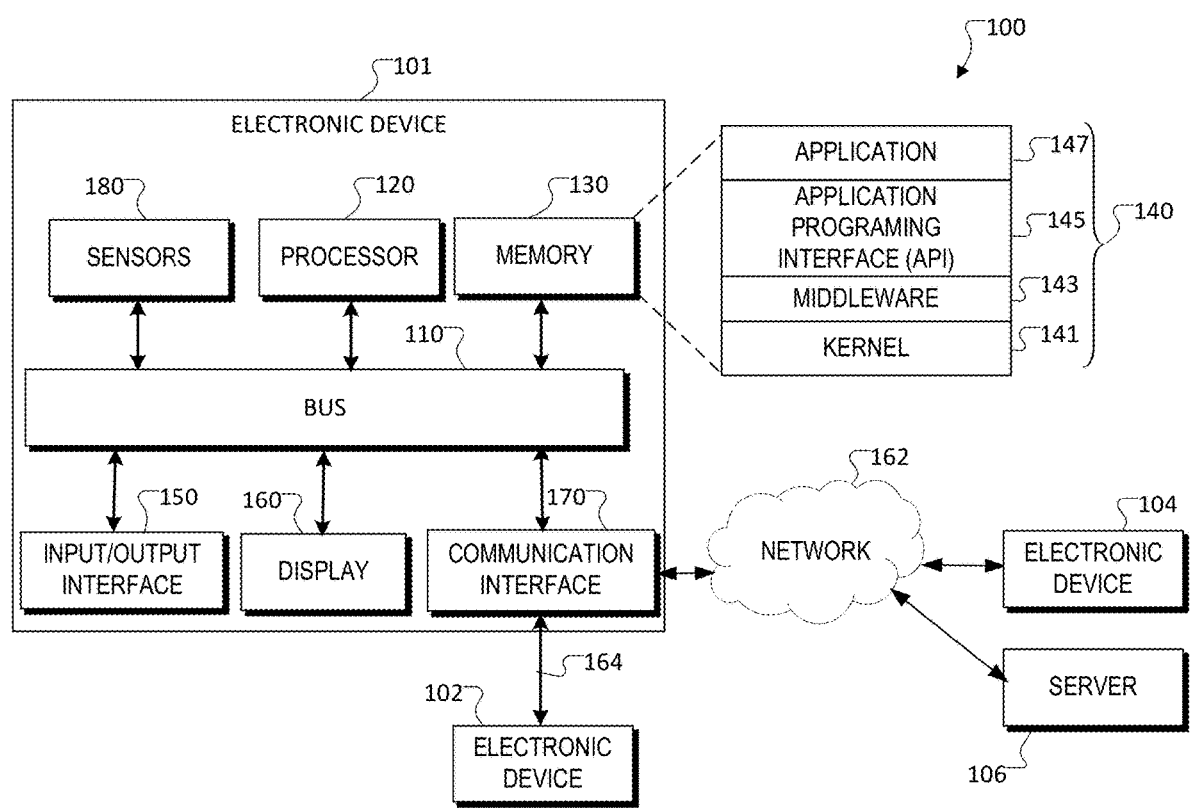
FIG. 1 illustrates an example of a network configuration according to an embodiment of this disclosure.

FIG. 1 illustrates an example network environment 100 according to various embodiments of the present disclosure. The embodiment of the network environment 100 shown in FIG. 1 is for illustration only. Other embodiments of the network environment 100 could be used without departing from the scope of this disclosure.

According to an embodiment of the present disclosure, an electronic device 101 is included in a network environment 100. The electronic device 101 can include at least one of a bus 110, a processor 120, a memory 130, an input/output (IO) interface 150, a display 160, a communication interface 170, or sensors 180. In some embodiments, the electronic device 101 can exclude at least one of the components or can add another component.

The bus 110 includes a circuit for connecting the components 120 to 170 with one another and transferring communications (e.g., control messages and/or data) between the components.

The processor 120 includes one or more of a central processing unit (CPU), an application processor (AP), or a communication processor (CP). The processor 120 is able to perform control on at least one of the other components of the electronic device 101, and/or perform an operation or data processing relating to communication.

For example, the processor 120 can receive a plurality of frames captured by the camera during a capture event. The processor 120 can identify a salient region in each of the plurality of frames. The processor 120 can determine a reference frame from the plurality of frames based on the identified salient regions. The processor 120 can fuse non-reference frames with the determined reference frame into a completed frame. The processor 120 can operate the display to display the completed frame.

The memory 130 can include a volatile and/or non-volatile memory. For example, the memory 130 can store commands or data related to at least one other component of the electronic device 101. In various embodiments, the memory 130 can store spatial map data that can include mapping information of a real environment such as the interior of an office building, mall, house, amusement park, neighborhood or any other real world or virtual world mapping information utilized by an application 147 on the electronic device 101. According to an embodiment of the present disclosure, the memory 130 stores software and/or a program 140. The program 140 includes, e.g., a kernel 141, middleware 143, an application programming interface (API) 145, and/or an application program (or "application") 147. At least a portion of the kernel 141, middleware 143, or API 145 can be denoted an operating system (OS).

For example, the kernel 141 can control or manage system resources (e.g., the bus 110, processor 120, or a memory 130) used to perform operations or functions implemented in other programs (e.g., the middleware 143, API 145, or application program 147). The kernel 141 provides an interface that allows the middleware 143, the API 145, or the application 147 to access the individual components of the electronic device 101 to control or manage the system resources.

The middleware 143 can function as a relay to allow the API 145 or the application 147 to communicate data with the kernel 141, for example. A plurality of applications 147 can be provided. The middleware 143 is able to control work requests received from the applications 147, e.g., by allocating the priority of using the system resources of the electronic device 101 (e.g., the bus 110, the processor 120, or the memory 130) to at least one of the plurality of applications 147.

The API 145 is an interface allowing the application 147 to control functions provided from the kernel 141 or the middleware 143. For example, the API 145 includes at least one interface or function (e.g., a command) for filing control, window control, image processing, or text control.

The IO interface 150 serve as an interface that can, e.g., transfer commands or data input from a user or other external devices to other component(s) of the electronic device 101. Further, the IO interface 150 can output commands or data received from other component(s) of the electronic device 101 to the user or the other external device.

The display 160 includes, e.g., a liquid crystal display (LCD), a light emitting diode (LED) display, an organic light emitting diode (OLED) display, or a microelectromechanical systems (MEMS) display, or an electronic paper display. The display 160 is able to display, e.g., various contents (e.g., text, images, videos, icons, or symbols) to the user. The display 160 can include a touchscreen and may receive, e.g., a touch, gesture, proximity or hovering input using an electronic pen or a body portion of the user.

For example, the communication interface 170 is able to set up communication between the electronic device 101 and an external electronic device (e.g., a first electronic device 102, a second external electronic device 104, or a server 106). For example, the communication interface 170 can be connected with the network 162 or 164 through wireless or wired communication to communicate with the external electronic device. The communication interface 170 can be a wired or wireless transceiver or any other component for transmitting and receiving signals, such as video feeds or video streams.

Electronic device 101 further includes one or more sensors 180 that can meter a physical quantity or detect an activation state of the electronic device 101 and convert metered or detected information into an electrical signal. For example, sensor 180 can include one or more buttons for touch input, a camera, a gesture sensor, a gyroscope or gyro sensor, an air pressure sensor, a magnetic sensor or magnetometer, an acceleration sensor or accelerometer, a depth or distance sensor, a grip sensor, a proximity sensor, a color sensor (e.g., a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an IR sensor, an ultrasound sensor, an iris sensor, a fingerprint sensor, etc. The sensor(s) 180 can further include a control circuit for controlling at least one of the sensors included therein. Any of these sensor(s) 180 can be located within the electronic device 101. A camera sensor 180 can capture a plurality of frames for a single image to be combined by the processor 120.

The first external electronic device 102 or the second external electronic device 104 can be a wearable device or an electronic device 101-*mountable* wearable device (e.g., an optical head mounted display (HMD)). When the electronic device 101 is mounted in a HMD (e.g., the electronic device 102), the electronic device 101 is able to detect the mounting in the HMD and operate in an augmented reality mode. In certain embodiments, the electronic device 101 is able to detect the mounting in the HMD and operate in an augmented reality mode. When the electronic device 101 is mounted in the electronic device 102 (e.g., the HMD), the electronic device 101 can communicate with the electronic device 102 through the communication interface 170. The electronic device 101 can be directly connected with the electronic device 102 to communicate with the electronic device 102 without involving a separate network.

The wireless communication is able to use at least one of, e.g., long term evolution (LTE), long term evolution-advanced (LTE-A), 5th generation wireless system (5G), mm-wave or 60 GHz wireless communication, Wireless USB, code division multiple access (CDMA), wideband code division multiple access (WCDMA), universal mobile telecommunication system (UMTS), wireless broadband (Wi-Bro), or global system for mobile communication (GSM), as a cellular communication protocol. The wired connection can include at least one of universal serial bus (USB), high definition multimedia interface (HDMI), recommended standard 232 (RS-232), or plain old telephone service (POTS).

The network 162 includes at least one of communication networks. Examples of communication include a computer network (e.g., local area network (LAN) or wide area network (WAN)), Internet, or a telephone network.

The first and second external electronic devices 102 and 104 and server 106 each can be a device of the same or a different type from the electronic device 101. According to certain embodiments of the present disclosure, the server 106 includes a group of one or more servers. According to certain embodiments of the present disclosure, all or some of operations executed on the electronic device 101 can be executed on another or multiple other electronic devices (e.g., the electronic devices 102 and 104 or server 106). According to certain embodiments of the present disclosure, when the electronic device 101 should perform some function or service automatically or at a request, the electronic device 101, instead of executing the function or service on its own or additionally, can request another device (e.g., electronic devices 102 and 104 or server 106) to perform at least some functions associated therewith. The other electronic device (e.g., electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique can be used, for example.

Although FIG. 1 shows that the electronic device 101 includes the communication interface 170 to communicate with the external electronic device 104 or server 106 via the network 162, the electronic device 101 can be independently operated without a separate communication function, according to an embodiment of the present disclosure.

The server 106 can support to drive the electronic device 101 by performing at least one of operations (or functions) implemented on the electronic device 101. For example, the server 106 can include a processing module or processor that may support the processor 120 implemented in the electronic device 101.

For example, the electronic device 101 can include an event processing module, such as within processor 120. The event processing module can process at least part of information obtained from other elements (e.g., the processor 120, the memory 130, the input/output interface 150, or the communication interface 170) and can provide the same to the user in various manners. The server event processing module can include at least one of the components of the event processing module and perform (or instead perform) at least one of the operations (or functions) conducted by the event processing module.

For example, according to an embodiment of the present disclosure, the event processing module processes information related to an event, which is generated while the electronic device 101 is mounted in a wearable device (e.g., the electronic device 102) to function as a display apparatus and to operate in the augmented reality mode, to fit the augmented reality mode and display the processed information. When the event generated while operating in the augmented reality mode is an event related to running an application, the event processing module can block the running of the application or process the application to operate as a background application or process. Additional information on the event processing module 185 may be provided through FIG. 2 described below.

The event processing module can be separate from the processor 120 or at least a portion of the event processing module can be included or implemented in the processor 120 or at least one other module, or the overall function of the event processing module can be included or implemented in the processor 120 shown or another processor. The event processing module can perform operations according to embodiments of the present disclosure in interoperation with at least one program 140 stored in the memory 130.

Figure 2:
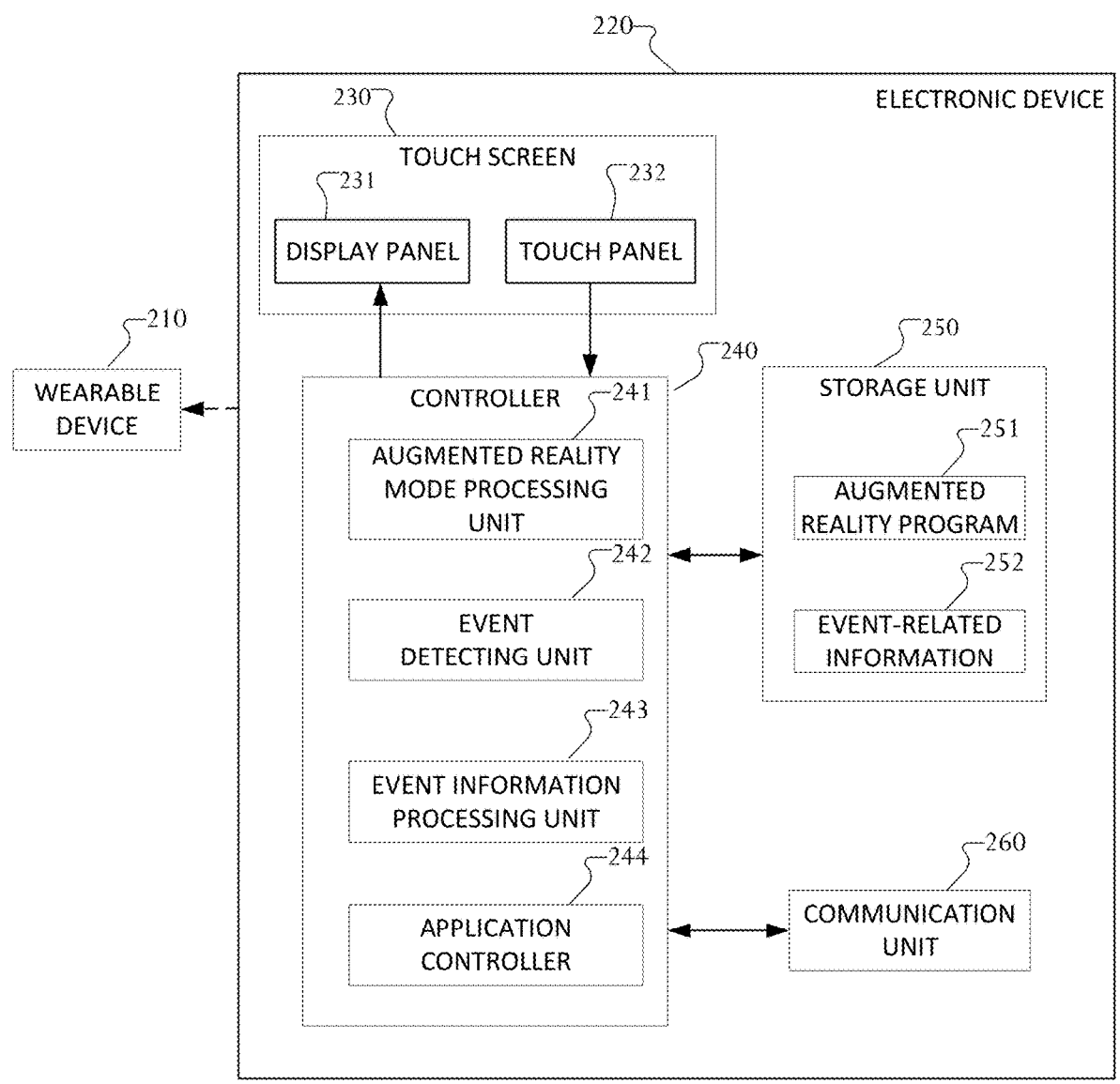
FIG. 2 is a block diagram of an example configuration of an electronic device according to an embodiment of this disclosure.

FIG. 2 illustrates an example electronic device 220 according to various embodiments of the present disclosure. The embodiment of the electronic device 220 shown in FIG. 2 is for illustration only. Other embodiments of electronic device 220 could be used without departing from the scope of this disclosure. The electronic device 220 depicted in FIG. 2 can be configured the same as, or similar to, any of electronic devices 101, 102, or 104.

FIG. 2 is a block diagram illustrating an example configuration of an electronic device according to an embodiment of the present disclosure. Referring to FIG. 2, the electronic device 220 according to an embodiment of the present disclosure can be an electronic device 220 having at least one display. In the following description, the electronic device 220 can be a device primarily performing a display function or can denote a normal electronic device including at least one display. For example, the electronic device 220 can be an electronic device (e.g., a smartphone) having a touchscreen 230.

According to certain embodiments, the electronic device 220 can include at least one of a touchscreen 230, a controller 240, a storage unit 250, or a communication unit 260. The touchscreen 230 can include a display panel 231 and/or a touch panel 232. The controller 240 can include at least one of an augmented reality mode processing unit 241, an event determining unit 242, an event information processing unit 243, or an application controller 244.

For example, when the electronic device 220 is mounted in a wearable device 210, the electronic device 220 can operate, e.g., as an HMD, and run an augmented reality mode. Further, according to an embodiment of the present disclosure, even when the electronic device 220 is not mounted in the wearable device 210, the electronic device 220 can run the augmented reality mode according to the user's settings or run an augmented reality mode related application. In the following embodiment, although the electronic device 220 is set to be mounted in the wearable device 210 to run the augmented reality mode, embodiments of the present disclosure are not limited thereto.

According to certain embodiments, when the electronic device 220 operates in the augmented reality mode (e.g., the electronic device 220 is mounted in the wearable device 210 to operate in a head mounted theater (HMT) mode), two screens corresponding to the user's eyes (left and right eye) can be displayed through the display panel 231.

According to certain embodiments, when the electronic device 220 is operated in the augmented reality mode, the controller 240 can control the processing of information related to an event generated while operating in the augmented reality mode to fit in the augmented reality mode and display the processed information. According to certain embodiments, when the event generated while operating in the augmented reality mode is an event related to running an application, the controller 240 can block the running of the application or process the application to operate as a background process or application.

More specifically, according to an embodiment of the present disclosure, the controller 240 can include at least one of an augmented reality mode processing unit 241, an event determining unit 242, an event information processing unit 243, or an application controller 244 to perform functions according to various embodiments of the present disclosure. An embodiment of the present disclosure can be implemented to perform various operations or functions as described below using at least one component of the electronic device 220 (e.g., the touchscreen 230, controller 240, or storage unit 250).

According to certain embodiments, when the electronic device 220 is mounted in the wearable device 210 or the augmented reality mode is run according to the user's setting or as an augmented reality mode-related application runs, the augmented reality mode processing unit 241 can process various functions related to the operation of the augmented reality mode. The augmented reality mode processing unit 241 can load at least one augmented reality program 251 stored in the storage unit 250 to perform various functions.

The event detecting unit 242 determines or detects that an event is generated while operated in the augmented reality mode by the augmented reality mode processing unit 241. Further, the event detecting unit 242 can determine whether there is information to be displayed on the display screen in relation with an event generated while operating in the augmented reality mode. Further, the event detecting unit 242 can determine that an application is to be run in relation with an event generated while operating in the augmented reality mode. Various embodiments of an application related to the type of event are described below.

The event information processing unit 243 can process the event-related information to be displayed on the display screen to fit the augmented reality mode when there is information to be displayed in relation with an event occurring while operating in the augmented reality mode depending on the result of determination by the event detecting unit 242. Various methods for processing the event-related information can apply. For example, when a three-dimensional (3D) image is implemented in the augmented reality mode, the electronic device 220 converts the event-related information to fit the 3D image. For example, event-related information being displayed in two dimensions (2D) can be converted into left and right eye information corresponding to the 3D image, and the converted information can then be synthesized and displayed on the display screen of the augmented reality mode being currently run.

When it is determined by the event detecting unit 242 that there is an application to be run in relation with the event occurring while operating in the augmented reality mode, the application controller 244 performs control to block the running of the application related to the event. According to certain embodiments, when it is determined by the event detecting unit 242 that there is an application to be run in relation with the event occurring while operating in the augmented reality mode, the application controller 244 can perform control so that the application is run in the background so as not to influence the running or screen display of the application corresponding to the augmented reality mode when the event-related application runs.

The storage unit 250 can store an augmented reality program 251. The augmented reality program 251 can be an application related to the augmented reality mode operation of the electronic device 220. The storage unit 250 can also store the event-related information 252. The event detecting unit 242 can reference the event-related information 252 stored in the storage unit 250 in order to determine whether the occurring event is to be displayed on the screen or to identify information on the application to be run in relation with the occurring event.

The wearable device 210 can be an electronic device including at least one function of the electronic device 101 shown in FIG. 1, and the wearable device 210 can be a wearable stand to which the electronic device 220 can be mounted. In case the wearable device 210 is an electronic device, when the electronic device 220 is mounted on the wearable device 210, various functions can be provided through the communication unit 260 of the electronic device 220. For example, when the electronic device 220 is mounted on the wearable device 210, the electronic device 220 can detect whether to be mounted on the wearable device 210 for communication with the wearable device 210 and can determine whether to operate in the augmented reality mode (or an HMT mode).

According to certain embodiments, upon failure to automatically determine whether the electronic device 220 is mounted when the communication unit 260 is mounted on the wearable device 210, the user can apply various embodiments of the present disclosure by running the augmented reality program 251 or selecting the augmented reality mode (or, the HMT mode). According to an embodiment of the present disclosure, when the wearable device 210 functions with or as part the electronic device 101, the wearable device can be implemented to automatically determine whether the electronic device 220 is mounted on the wearable device 210 and enable the running mode of the electronic device 220 to automatically switch to the augmented reality mode (or the HMT mode).

At least some functions of the controller 240 shown in FIG. 2 can be included in the event processing module 185 or processor 120 of the electronic device 101 shown in FIG.

1. The touchscreen 230 or display panel 231 shown in FIG. 2 can correspond to the display 160 of FIG. 1. The storage unit 250 shown in FIG. 2 can correspond to the memory 130 of FIG. 1.

Although in FIG. 2 the touchscreen 230 includes the display panel 231 and the touch panel 232, according to an embodiment of the present disclosure, the display panel 231 or the touch panel 232 may also be provided as a separate panel rather than being combined in a single touchscreen 230. Further, according to an embodiment of the present disclosure, the electronic device 220 can include the display panel 231, but exclude the touch panel 232.

According to certain embodiments, the electronic device 220 can be denoted as a first device (or a first electronic device), and the wearable device 210 may be denoted as a second device (or a second electronic device) for ease of description.

According to certain embodiments, an electronic device can comprise a display unit displaying on a screen corresponding to an augmented reality mode and a controller performing control that detects an interrupt according to an occurrence of at least one event, that varies event-related information related to the event in a form corresponding to the augmented reality mode, and that displays the varied event-related information on the display screen that corresponds to the augmented reality mode.

According to certain embodiments, the event can include any one or more selected from among a call reception event, a message reception event, an alarm notification, a scheduler notification, a wireless fidelity (Wi-Fi) connection, a WiFi disconnection, a low battery notification, a data permission or use restriction notification, a no application response notification, or an abnormal application termination notification.

According to certain embodiments, the electronic device further comprises a storage unit configured for storing the event-related information when the event is not an event to be displayed in the augmented reality mode, wherein the controller can perform control to display the event-related information stored in the storage unit when the electronic device switches from the virtual reality mode into an augmented reality mode or a see-through (non-augmented reality) mode. According to certain embodiments, the electronic device can further comprise a storage unit that stores information regarding at least one event to be displayed in the augmented reality mode. According to certain embodiments, the event can include an instant message reception notification event. According to certain embodiments, when the event is an event related to running at least one application, the controller can perform control that blocks running of the application according to occurrence of the event. According to certain embodiments, the controller can perform control to run the blocked application when a screen mode of the electronic device switches from a virtual reality mode into an augmented reality mode or a see-through (non-augmented reality) mode. According to certain embodiments, when the event is an event related to running at least one application, the controller can perform control that enables the application, according to the occurrence of the event, to be run on a background of a screen of the augmented reality mode. According to certain embodiments, when the electronic device is connected with a wearable device, the controller can perform control to run the augmented reality mode. According to certain embodiments, the controller can enable the event-related information to be arranged and processed to be displayed in a three dimensional (3D) space of the augmented reality mode screen being displayed on a current display screen. According to certain embodiments, the electronic device 220 can include additional sensors such as one or more red, green, blue (RGB) cameras, dynamic vision sensor (DVS) cameras, 360 degree cameras, or a combination thereof.

Figure 3:
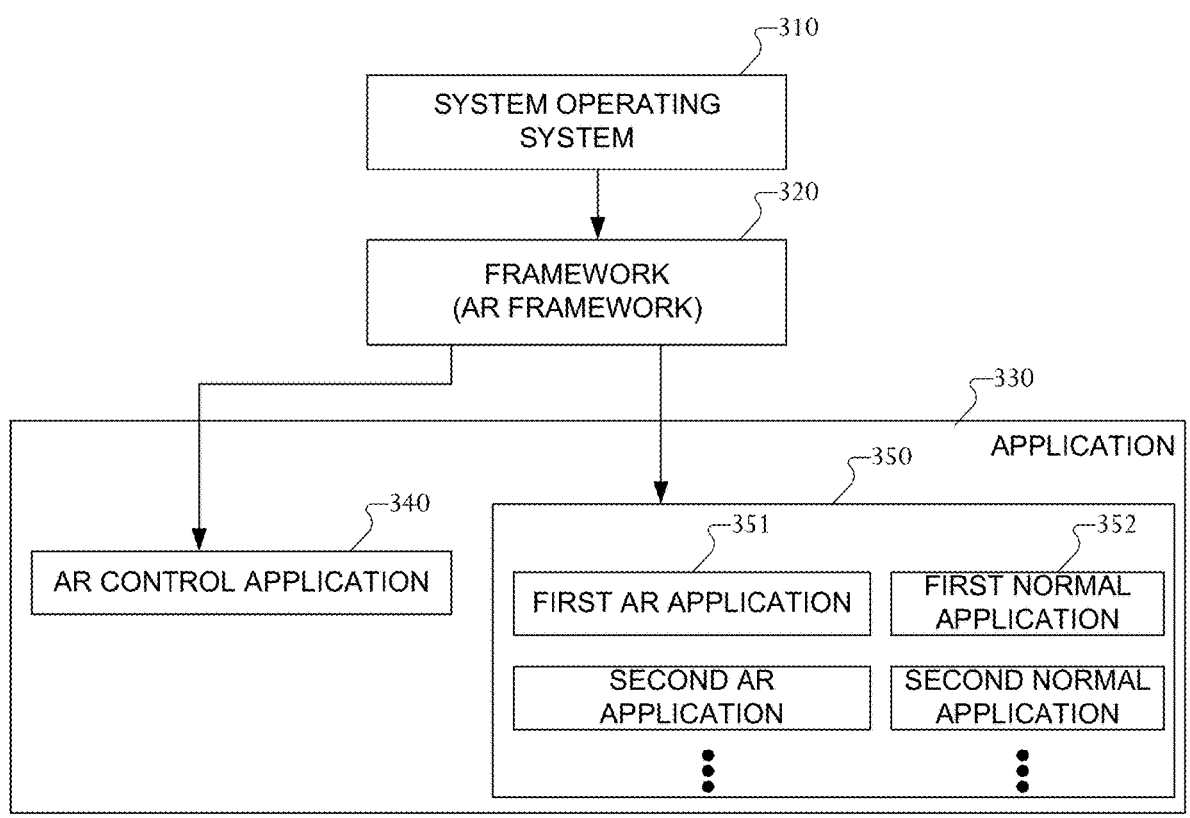
FIG. 3 is a block diagram that illustrates a program module according to an embodiment of this disclosure.

FIG. 3 is a block diagram illustrating a program module according to an embodiment of the present disclosure. The embodiment illustrated in FIG. 3 is for illustration only and other embodiments could be used without departing from the scope of the present disclosure. In the example shown in FIG. 3, although an augmented reality (AR) system is depicted, at least some embodiments of the present disclosure apply equally to virtual reality (VR) and augmented reality (AR). Referring to FIG. 3, the program module can include a system operating system (e.g., an OS) 310, a framework 320, and an application(s) 330.

The system operating system 310 can include at least one system resource manager or at least one device driver. The system resource manager can perform, for example, control, allocation, or recovery of the system resources. The system resource manager may include at least one manager, such as a process manager, a memory manager, or a file system manager. The device driver may include at least one driver, such as, for example, a display driver, a camera driver, a BLUETOOTH driver, a shared memory driver, a USB driver, a keypad driver, a Wi-Fi driver, an audio driver, or an inter-process communication (IPC) driver.

According to certain embodiments, the framework 320 (e.g., middleware) can provide, for example, functions commonly required by an application or provide the application with various functions through an application programming interface (API) to allow the application to efficiently use limited system resources inside the electronic device.

The AR framework included in the framework 320 can control functions related to augmented reality mode operations on the electronic device. For example, when running an augmented reality mode operation, the AR framework 320 can control at least one AR application 351, which is related to augmented reality, among applications 330 so as to provide the augmented reality mode on the electronic device.

The application(s) 330 can include a plurality of applications and can include at least one AR application 351 running in the augmented-reality mode and at least one normal application 352 running in a non-augmented-reality mode.

The application(s) 330 can further include an AR control application 340. An operation of the at least one AR application 351 and/or at least one normal application 352 can be controlled by the AR control application 340.

When at least one event occurs while the electronic device operates in the augmented reality mode, the system operating system 310 can notify the framework 320, for example the AR framework, of an occurrence of an event.

The framework 320 can then control the running of the normal application 352 so that event-related information can be displayed on the screen for the event occurring in the non-augmented reality mode, but not in the augmented reality mode. When there is an application to be run in relation with the event occurring in the normal mode, the framework 320 can perform or provide control to run at least one normal application 352.

According to certain embodiments, when an event occurs while operating in the augmented reality mode, the framework 320, for example the AR framework, can block the operation of at least one normal application 352 to display the information related to the occurring event. The framework 320 can provide the event occurring, while operating in the augmented reality mode, to the AR control application 340.

The AR control application 340 can process the information related to the event occurring while operating in the augmented reality mode to fit within the operation of the augmented reality mode. For example, a 2D, planar event-related information can be processed into 3D information.

The AR control application 340 can control at least one AR application 351 currently running and can perform control to synthesize the processed event-related information for display on the screen being run by the AR application 351 and display the result of the event related information thereon.

According to certain embodiments, when an event occurs while operating in the augmented reality mode, the framework 320 can perform control to block the running of at least one normal application 352 related to the occurring event.

According to certain embodiments, when an event occurs while operating in the augmented reality mode, the framework 320 can perform control to temporarily block the running of at least one normal application 352 related to the occurring event, and then when the augmented reality mode terminates, the framework 320 can perform control to run the blocked normal application 352.

According to certain embodiments, when an event occurs while operating in the augmented reality mode, the framework 320 can control the running of at least one normal application 352 related to the occurring event so that the at least one normal application 352 related to the event operates in the background so as not to influence the screen used by the AR application 351 currently running.

Embodiments described in connection with FIG. 3 are examples for implementing an embodiment of the present disclosure in the form of a program, and embodiments of the present disclosure are not limited thereto and rather can be implemented in other various forms. Further, while the embodiment described in connection with FIGS. 2 and 3 references AR, it can be applied to other scenarios such as mixed reality, or virtual reality etc. Collectively the various reality scenarios can be referenced herein as extended reality (XR).

Various examples of aspects of a user interface (UI) for XR scenarios. It should be noted that aspects of XR UIs disclosed herein are merely examples of XR UIs and are not intended to be limiting.

There are different types of display elements that can be used in XR scenarios. For example, displayed elements are either tied directly to the real world or tied loosely to the XR display space. In-world elements are elements that move in relation to the real or virtual environment itself (i.e., move in relation to the environment itself). Depending on the object, in-world elements may not necessarily move in relation to the user's head when wearing a head mounted display (HMD).

Heads up display (HUD) elements are elements wherein users can make small head movements to gaze or look directly at various application (app) elements without moving the HUD elements container or UI panel in the display view. HUD elements can be a status bar or UI by which information is visually displayed to the user as part of the display.

Many mobile VR and AR (XR) devices use 3DOF in orientation only hand held devices (HHD) as input devices. As such, many mobile XR systems are not equipped to support 6 DOF without costly new hardware. Embodiments of the present disclosure provide a system that can take simple active or passive tracking devices placed on the wrist to provide the missing 3 DOF in position employing the existing camera, or other sensors, on the mobile device. Embodiments of the present disclosure relate to distributed device tracking by an electronic device. Because a user can interact in a XR environment, an ability to track certain objects through six-degrees of freedom (6DOF) has become increasingly important. Current controllers predominantly have sensors which track 3 degrees of freedom (DOF), typically orientation. While more capable DOF solutions (e.g., 6DOF, 9DOF, etc.) exist, these DOF solutions are multisensory, which result in a greater cost and require more power than for a typical 3DOF controller. A significant issue with the current technology is that objects are tracking using optical signals. The use of optical signals requires considerable processor function resulting in higher power consumption and shorter battery life of the detecting device. Additionally, depending upon the position of the emitters and motion of the object, signals from one or more emitters on the object may become obscured.

Embodiments of the present disclosure provide for a 6DOF hand held device tracking system that allows for backward support of 3DOF hand held devices. Embodiments of the present disclosure support the coupling of two devices that perform separate 3DOF tracking functions that when combined create a 6-DOF tracking solution. In addition, by placing the positional tracking solution on the wrist instead of extending from the hand, the tracking solution can be ran at a slower rate lowering power and computation requirements due to the fact the wrist will experience lower magnitudes of transformation then the top of the HHD where most optical based trackers are placed. That is, by having a tracking target on the arm of the user instead of a hand, embodiments of the present disclosure utilize less robust tracking solutions to provide 6DOF information. A device in the hand experiences greater acceleration and small bursts of speed with respect to the arm. Embodiments of the present disclosure provide for separate tracking of two devices to provide 6DOF information regarding one of the devices.

Embodiments of the present disclosure provide a 6DOF system by coupling a 3DOF tracking system of a wrist based device (WBD) with a 3DOF hand held device (HHD). The system can use the input from the two part system to calculate 6DOF for the HHD (which can be done either on a separate device (e.g., an HMD), the HHD, or WBD). The 3DOF WBD is used to measure displacement in position. The 3DOF HHD is used to measure deployments in orientation. By employing known inverse kinematics, a 6DOF can be solved for the HHD. Certain embodiments include an inertial measurement unit (IMU) within the WBD; thus providing a 6 DOF at the wrist position further refining the position and orientation of the HHD. Additionally, by physically connecting the WBD and the HHD either device can serve to provide power and communication with a HHD or other devices.

Figure 4A:
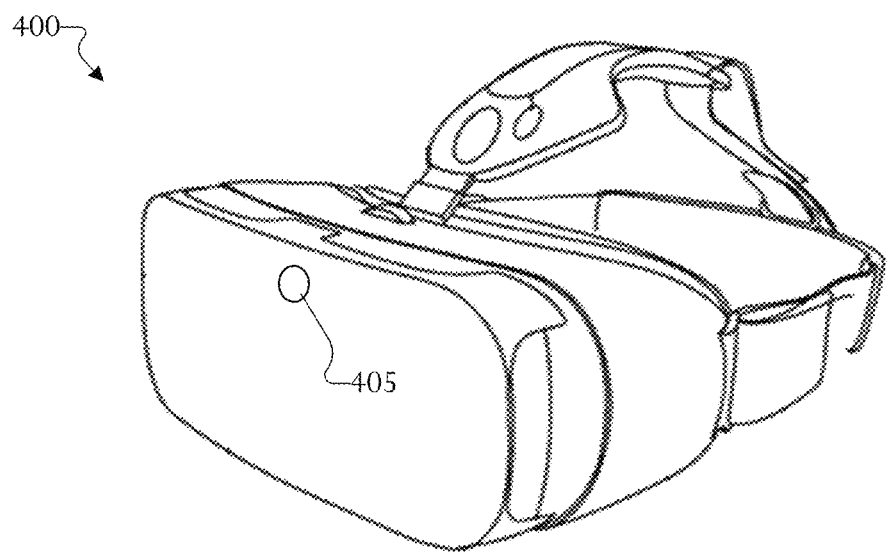
FIGS. 4A and 4B illustrate examples of a head mounted display (HMD) for according to an embodiment of this disclosure.
Figure 4B:
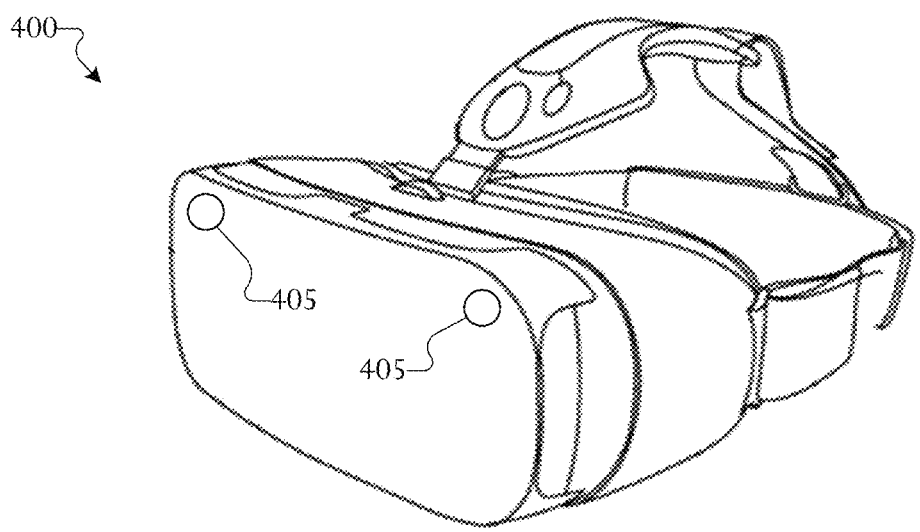

FIGS. 4A and 4B illustrate examples of a head mounted display (HMD) for according to an embodiment of this disclosure. The embodiments of the HMDs 400 shown in FIGS. 4A and 4B are for illustration only and other configurations could be used without departing from the scope of the present disclosure.

The HMD 400 can generate an augmented reality environment in which a real-world environment is rendered with augmented information. A user is able to see through the screen 410 as well as able to see images rendered, projected or displayed on the screen 410. Images may be projected onto the screen, generated or rendered by the screen or reflected on the screen. In certain embodiments, the HMD 400 includes a display that can be a liquid crystal display (LCD), a Light emitting diode (LED), active-matrix organic light emitting diode (AMOLED), or the like. In certain embodiments, the HMD 400 can include a camera or camera input configured to capture real-world information and display, via the non-see through display, real-world information. The real-world information captured by the camera can be rendered as a video image on the display with augmented information.

In certain embodiments, the HMD 400 includes a head-mountable apparatus and a portable electronic device. The head-mountable apparatus can be a head-mount frame including a head strap or other mounting means configured to couple the head-mountable head to a head of a user. The head-mountable apparatus also includes a frame element adapted to couple to or hold the portable electronic device. The portable electronic device can be configured the same as, or similar to, electronic device 101 or electronic device 220. The portable electronic device is removably coupled to the head-mountable apparatus.

In certain embodiments, the HMD 400 includes a tracking sensor 405. The HMD 400 may include a single tracking sensor 405 as shown in the example illustrated in FIG. 4A or may include multiple tracking sensors 405 as shown in the example illustrated in FIG. 4B. Although the example shown in FIG. 4B depicts two tracking sensors 405, embodiments, having three or more tracking sensors could be used without departing from the scope of the present disclosure. In certain embodiments in which the HMD 400 includes a removable portable electronic device, one or more of the tracking sensors 405 can be disposed on the portable electronic device. In certain embodiments in which the HMD 400 includes a removable portable electronic device, one or more of the tracking sensors 405 can be disposed on the head-mountable apparatus.

The tracking sensors 405 are configured to detect signals emitted from a first orientation tracker device (OTD) and a hand held device (HHD). For example, the OTD can be a wrist based device (WBD). In certain embodiments, one or more of the signals detected by the tracking sensors 405 are ultrasonic signals emitted by the OTD and/or the HHD. In certain embodiments, one or more of the signals detected by the tracking sensors 405 are optic signals emitted by the OTD and/or the HHD. For example, the tracking sensors 405 can include one or more infrared sensors configured to detect one or more infrared signals emitted by the OTD, the HHD, or both. In certain embodiments, the tracking sensors 405 are configured to detect a magnetic field generated by the OTD, the HHD, or both. For example, the tracking sensors 405 can include one or more sensor magnetic coils configured to sense the magnetic field while the OTD, the HHD, or both, can include source magnetic coils configured to generate a magnetic field.

In certain embodiments, the tracking sensors 405 are configured to sense a first signal type from the OTD and a second signal type from the HHD. For example, the tracking sensors 405 can detect an ultrasonic signal from the OTD and an optical signal from the HHD. Alternatively, the tracking sensors 405 can detect an ultrasonic signal from the OTD and a magnetic fields generated by the HHD. Alternatively, the tracking sensors 405 can detect an optical from the OTD and an ultrasonic signal from the HHD. Alternatively, the tracking sensors 405 can detect an optical from the OTD and a magnetic fields generated by the HHD. Alternatively, the tracking sensors 405 can detect a magnetic field generated by the OTD and an optical signal from the HHD. Alternatively, the tracking sensors 405 can detect a magnetic field generated by the OTD and an ultrasonic signal from the HHD. Examples of different possible tracking sensors include, but are not limited to: red-green-blue (RGB) cameras, microphones, photosensors, light emitting diodes (LEDs), infrared emitters, infrared sensors, and the like.

In certain embodiments, the HMD 400 includes a processor configured to process signals detected by the tracking sensors 405. The processor can be the same as, or similar to, processor 120 or controller 240. The processor can be a single processor or a multi-processor system. The processor processes the detected signals to determine a position or change in position of an object. For example, the object can be an HHD disposed in a hand of a user. The signals detected by the tracking sensors 405 include a first set of signals detected or received from the OTD and a second set of signals detected or received from the HHD. The processor calculates a position, or change in position, of the object within a 6DOF space. For example, the processor can calculate a position or motion of the object based on 3DOF information received from the HHD and 3DOF information received from the OTD.

In certain embodiments, the tracking sensors 405 are configured to emit signals. A processor that is the same as, or similar to, processor 120 or controller 240 can be disposed in the OTD or HHD. The processor can be a single processor or a multi-processor system. The processor disposed in one of the HHD or OTD can detect the signals emitted by the HMD 400 using corresponding detector tracking sensors. The processor processes the detected signals to determine a position or change in position of the respective HHD or OTD. For example, the object can be an HHD disposed in a hand of a user. The signals emitted by the tracking sensors 405 can be detected by the OTD, for example, when the OTD includes the processor. The OTD can also detect signals emitted from the HHD. In other example, the HHD includes the processor and is able to detect signals emitted by the HMD 400 and OTD. The processor calculates a position, or change in position, of the object within a 6DOF space. For example, the processor can calculate a position or motion of the object based on 3DOF information received from the HHD and 3DOF information received from the OTD.

Figure 5A:
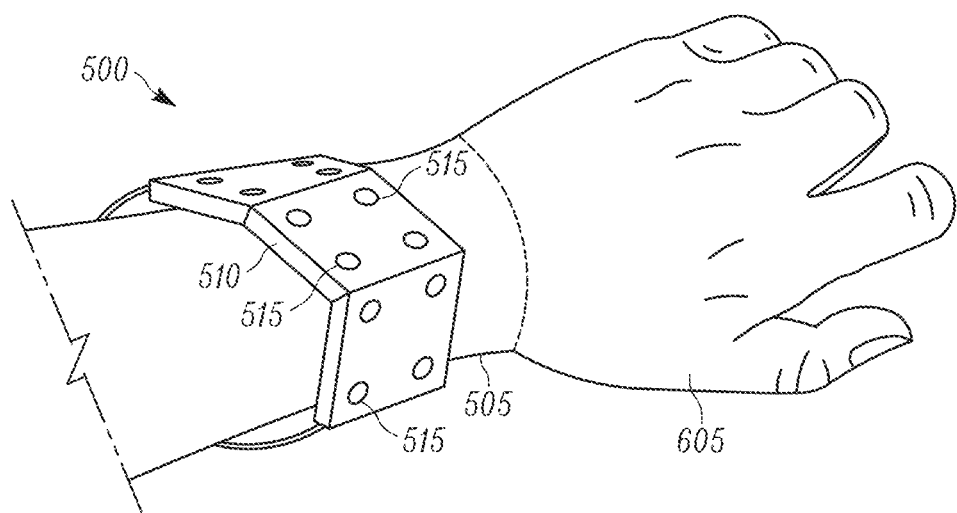
FIGS. 5A, 5B, and 5C illustrate examples of an orientation tracking device (OTD) for degree of freedom (DOF) tracking according to embodiments of the present disclosure.
Figure 5B:
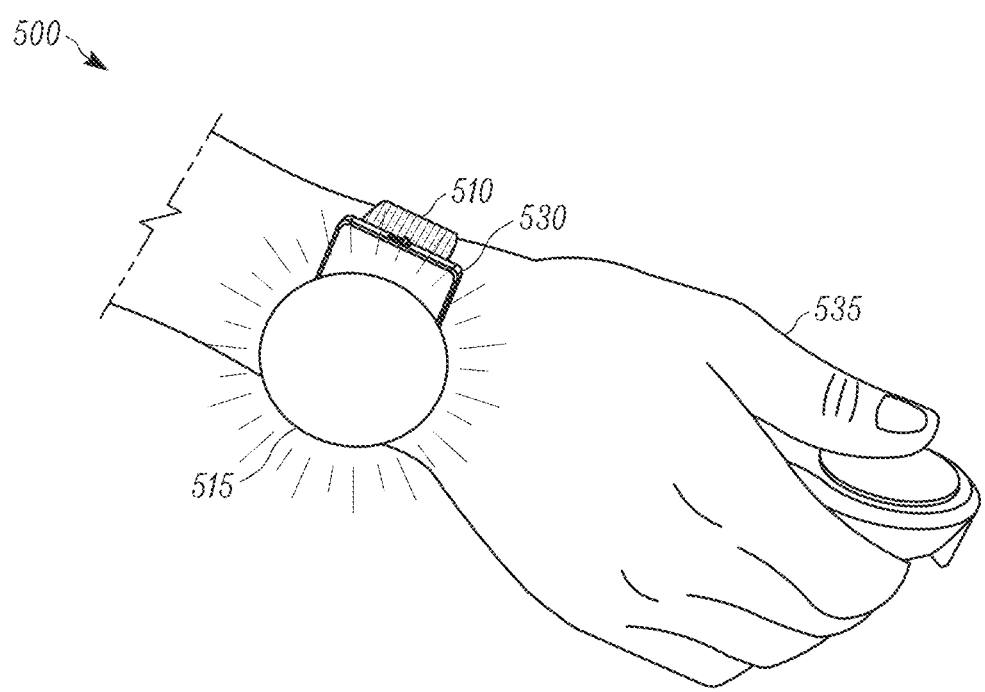
Figure 5C:
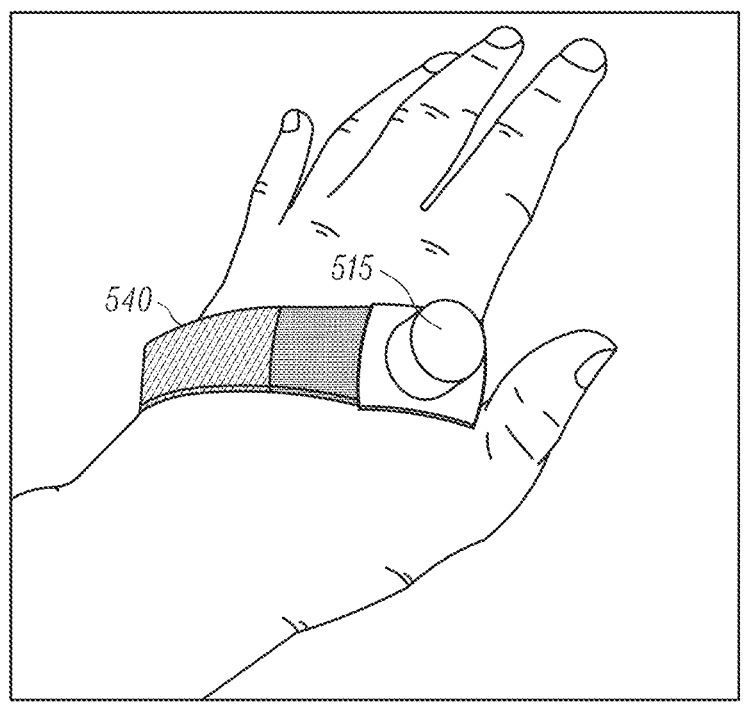

FIGS. 5A, 5B, and 5C illustrate examples of an orientation tracking device (OTD) for degree of freedom (DOF) tracking according to embodiments of the present disclosure. The embodiments of the OTD 500 shown in FIGS. 5A, 5B and 5C are for illustration only. Other embodiments could be used without departing from the scope of the present disclosure.

In the examples shown in FIGS. 5A and 5B, the OTD 500 is configured as a wrist based device (WBD) that is configured to wrap around a wrist 505 of a user. In certain embodiments, the OTD 500 is a dedicated 3DOF device such that it is only configured to provide movement, or change in position, information to another electronic device. In certain embodiments, the OTD 500 is configured to perform other functions such that providing movement, or change in position, information to another electronic device is one of a number of functions that can be performed by the OTD 500. For example, the OTD 500 can be configured as a watch, smart-watch, fitness device, or other wearable electronic device. In certain embodiments, the OTD 500 is configured to be worn on a body part other than the wrist of a user. For example, the OTD 500 can be configured to be worn on a forearm, an elbow, or arm of the user.

The OTD 500 includes a mounting band 510 and one or more tracking sensors 515. The mounting band 510 can be configured as a wrist-band or arm band. The mounting band 510 can include a buckle or clasp to secure the mounting band 510 to a wrist of the user. In certain embodiments, the mounting band 510 includes an elastic material configured to secure the mounting band 510 to the wrist of the user. The mounting band 510 also is configured to maintain an orientation of the OTD 500 on the wrist of the user such that the one or more tracking sensors 515 do not change in relation to the wrist of the user. That is, the mounting band 510 is configured to ensure that the OTD 500 does not slide or rotate on the wrist of the user.

In the example shown in FIG. 5A, the mounting band 510 includes a number of discrete faces, each having four tracking sensors 515. Embodiments in which the mounting band 510 includes more faces, few faces, or no faces could be used without departing from the scope of the present disclosure.

In the example shown in FIG. 5B, the mounting band 510 includes, or is coupled to, a base 530, having one tracking sensor 515. Embodiments in which the mounting band 510 includes more than one base 530 with more than one tracking sensor 515 could be used without departing from the scope of the present disclosure. Additionally, although the tracking sensor 515 appears to be of a certain size with respect to the mounting band 510, base 530 and users hand 535, embodiments in which the one tracking sensor 515 is larger or smaller could be used without departing from the scope of the present disclosure.

The OTD 500 includes one or more tracking sensors 515. The one or more tracking sensors 515 can be included in the mounting band 510 or coupled to the mounting band 510. The OTD 500 can include enough of the one or more tracking sensors 515 to be disposed to wrap around the wrist of the user. For example, the OTD 500 can include at least one tracker 515 on each face or at least one tracker 515 pointing in each direction such that, regardless of the orientation of the wrist, at least one tracker 515 is visible to the HMD 400, to the HHD, or to both.

In the examples shown in FIG. 5C, the OTD 500 is configured as a WBD with a tracking sensor 515 positioned to be proximate a particular digit or phalange of a hand of the user. For example, the WBD can include a strap 540 disposed to wrap around a portion of the hand such that tracking sensor 515 is disposed proximate to a thumb of the user. As shown in the example shown in FIG. 5C, the tracking sensor 515 can include a processing circuit and sensing element. Additionally, although the tracking sensor 515 appears to be of a certain size with respect to the strap 540 and users hand 535, embodiments with more than one tracking sensor 515 or in which the one tracking sensor 515 is larger or smaller could be used without departing from the scope of the present disclosure.

In certain embodiments, the OTD 500 is configured to communicate with the HMD 400. The OTD 500 can be configured as a WBD and the HMD 400 can include a plurality of tracking sensors 405 disposed in different locations on the HMD 400. The OTD 500 can emit signals that are detected by the tracking sensors 405 on the HMD 400. Thereafter, the HMD 400 processed data from the tracking sensors 405 regarding the signals detected by the tracking sensors 405 that indicate positional information of the OTD 500.

In certain embodiments, the one or more tracking sensors 515 are configured to emit signals towards the HMD 400, an HHD, or both. For example, 1) the WBD can send its IMU data to the HHD, which can be used for further IK calculation and/or routing to the OS device (typically the HMD 400) 2) information regarding the mode of operation can be adjusted by routing information via the HHD if the WBD does not have wireless communication capability. In certain embodiments, the one or more tracking sensors 515 are configured to emit ultrasonic signals. In certain embodiments, the one or more tracking sensors 515 are configured to emit optic signals. For example, the one or more tracking sensors 515 can include one or more infrared lights configured to emit one or more infrared signals to the HMD 400, the HHD, or both. In certain embodiments, the one or more tracking sensors 515 are configured to generate a magnetic field generated. For example, the one or more tracking sensors 515 can include one or more source magnetic coils configured to generate a magnetic field.

In certain embodiments, the one or more tracking sensors 515 are configured to sense a first signal type from the HMD 400, a second signal type from the HHD, or a combination thereof. For example, the one or more tracking sensors 515 can detect an ultrasonic signal from the HMD 400 and an optical signal from the HHD. Alternatively, the one or more tracking sensors 515 can detect an ultrasonic signal from the HMD 400 and a magnetic fields generated by the HHD. Alternatively, the one or more tracking sensors 515 can detect an optical from the HMD 400 and an ultrasonic signal from the HHD. Alternatively, the one or more tracking sensors 515 can detect an optical from the HMD 400 and a magnetic fields generated by the HHD. Alternatively, the tracking sensors 405 can detect a magnetic field generated by the HMD 400 and an optical signal from the HHD. Alternatively, the one or more tracking sensors 515 can detect a magnetic field generated by the HMD 400 and an ultrasonic signal from the HHD.

In certain embodiments, the OTD 500 includes a processor configured to process signals detected by the one or more tracking sensors 515. The processor can be the same as, or similar to, processor 120 or controller 240. The processor can be a single processor or a multi-processor system. The processor processes the detected signals to determine a position or change in position of an object. For example, the object can be an HHD disposed in a hand of a user. The signals detected by the one or more tracking sensors 515 include a first set of signals detected or received from the HMD 400, or a second set of signals detected or received from the HHD, or both. The processor calculates first orientation information regarding a position, or change in position, of the OTD 500. The first orientation information can include 3DOF information regarding the OTD 500. In embodiments in which the OTD 500 detects signals emitted by the HHD, the processor also can calculate second orientation information regarding a position, or change in position, of the HHD. The second orientation information can include 3DOF information regarding the HHD. In certain embodiments, the processor transmits, such as via a transmitter or transceiver included in the OTD 500, the first orientation information and the second orientation information to an external electronic device, such as the HMD 400 or HHD. In certain embodiments, the processor calculates 6DOF information of the HHD based on the first orientation information and the second orientation information. The 6DOF information relates to position information of the object within a 6DOF space. For example, the processor can calculate a position or motion of the object based on 3DOF information of the OTD, as measured from signals emitted by the HMD, and 3DOF information received from the HHD. The processor can transmit the 6DOF information to an external electronic device, such as the HMD 400 or HHD.

In certain embodiments, the OTD 500 is configured to couple to the HHD. For example, the OTD 500 can be coupled to the HHD through a wired or wireless communication link. That is, the OTD 500 can be "paired" with the HHD through a near-field wireless communication protocol, such as BLUETOOTH. The OTD 500 also can be tethered to the HHD through a wired communication link or a physical non-communicative tether. Additionally, the OTD 500 can be paired, or in communication with, the HMD 400.

In certain embodiments, the OTD 500 includes the one or more tracking sensors 515 and an IMU. The OTD 500 also can include a battery and a wireless communication unit. The wireless communication unit can be a transmitter, receiver, or transceiver.

Figure 6:
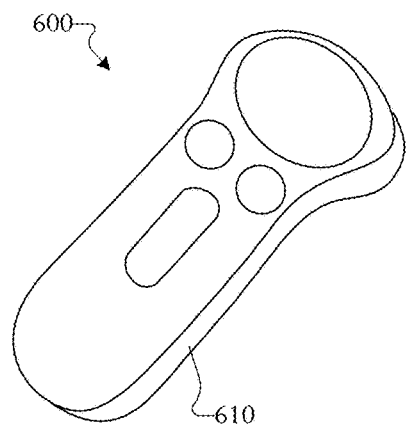
FIG. 6 illustrates a hand held device (HHD) for degree of freedom (DOF) tracking according to embodiments of the present disclosure.

FIG. 6 illustrates a hand held device (HHD) for degree of freedom (DOF) tracking according to embodiments of the present disclosure. The embodiment of the HHD 600 shown in FIG. 6 is for illustration only. Other embodiments could be used without departing from the scope of the present disclosure.

In the example shown in FIG. 6, the HHD 600 is configured as a remote device (RD) that is configured to be held in a hand of a user. In certain embodiments, the HHD 600 is a dedicated 3DOF device such that it is only configured to provide movement, or change in position, information to another electronic device. In certain embodiments, the HHD 600 is configured to perform other functions such as control of one or more functions of an object or control of one or more virtual objects in a virtual environment. In certain embodiments, the HHD 600 is configured to be affixed to the hand of the user. For example, the HHD 600 can be configured as a glove 605 (shown in FIG. 5A) or partial glove. In certain embodiments, the HHD 600 is configured as, or within, another object with a different form factor that is used or employed for a different purpose. For example, the HHD 600 can be configured as a sword, golf club, baseball bat, tennis racket, firearm, mobile electronic device, or the like.

The HHD 600 includes a housing 610 and one or more tracking sensors. The one or more tracking sensors can be included within the housing 610 or on a surface of housing 610.

In certain embodiments, the one or more tracking sensors are configured to emit signals towards the HMD 400, the OTD 500, or both. In certain embodiments, the one or more tracking sensors are configured to emit ultrasonic signals. In certain embodiments, the one or more tracking sensors are configured to emit optic signals. For example, the one or more tracking sensors can include one or more infrared lights configured to emit one or more infrared signals to the HMD 400, the OTD 500, or both. In certain embodiments, the one or more tracking sensors are configured to generate a magnetic field generated. For example, the one or more tracking sensors can include one or more source magnetic coils configured to generate a magnetic field.

In certain embodiments, the one or more tracking sensors are configured to sense a first signal type from the HMD 400. For example, the one or more tracking sensors can detect an ultrasonic signal from the HMD 400. Alternatively, the one or more tracking sensors can detect an ultrasonic signal from the HMD 400. Alternatively, the one or more tracking sensors can detect an optical from the HMD 400.

In certain embodiments, the HHD 600 includes a processor configured to process signals detected by the one or more tracking sensors. The processor can be the same as, or similar to, processor 120 or controller 240. The processor can be a single processor or a multi-processor system. The processor processes the detected signals to determine a position or change in position of the HHD 600. The signals detected by the one or more tracking sensors include a set of signals detected or received from the HMD 400. The processor calculates 3DOF orientation information regarding a position, or change in position, of the HHD 600. In certain embodiments, the processor receives, such as via a receiver or transceiver included in the HHD 600, additional 3DOF orientation information regarding a 3DOF position of the OTD 500. In certain embodiments, the processor calculates 6DOF information of the HHD 600 based on the additional 3DOF orientation information. The 6DOF information relates to position information of the HHD 600 within a 6DOF space. For example, the processor can calculate a position or motion of the object based on 3DOF information of the HHD 600, as measured from signals emitted by the HMD, and the additional 3DOF orientation information received from the OTD 500. The processor can transmit the 6DOF information to an external electronic device, such as the HMD 400 or OTD 500.

In certain embodiments, the OTD 500 is configured to couple to the HHD 600. For example, the OTD 500 can be coupled to the HHD 600 through a wired or wireless communication link. That is, the OTD 500 can be "paired" with the HHD 600 through a near-field wireless communication protocol, such as BLUETOOTH. The OTD 500 also can be tethered to the HHD 600 through a wired communication link or a physical non-communicative tether. Additionally, the HHD 600 can be paired, or in communication with, the HMD 400.

In certain embodiments, the HHD 600 includes the one or more tracking sensors and an IMU. The HHD 600 also can include a battery and a wireless communication unit. The wireless communication unit can be a transmitter, receiver, or transceiver.

Figure 7:
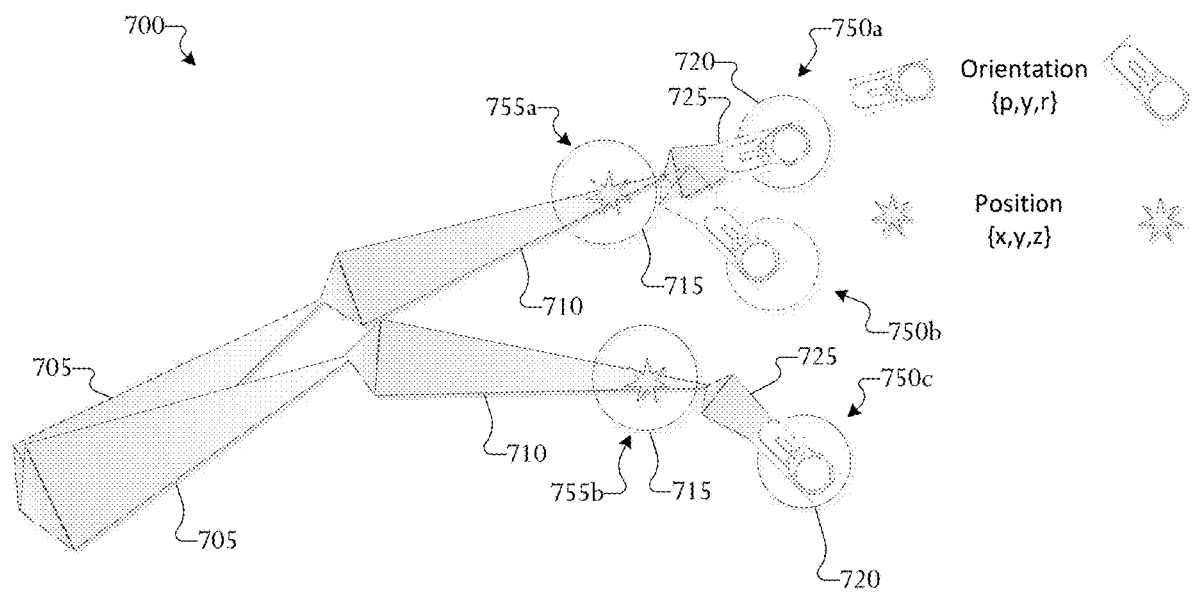
FIG. 7 illustrates inverse kinematic tracking according to embodiments of the present disclosure.

FIG. 7 illustrates inverse kinematic (IK) tracking according to embodiments of the present disclosure. The embodiment of the IK tracking 700 shown in FIG. 7 is for illustration. Other embodiments could be used without departing from the scope of the present disclosure.

In the example shown in FIG. 7, a motion of an arm 705 and forearm 710 of the user, a wrist based device 715, and a hand held object 720 within a hand 725 are depicted. The wrist based device 715 is a 3DOF trackable device, such as OTD 500, which is placed on a wrist of the user. The wrist is chosen because the wrist does not move as fast or as often as the hand 725 does. As such, slower tracking systems can be used (like a phone's camera at 30 fps) saving costs.

In certain embodiments, the wrist based device 715 includes a single tracking device, such as a ball, which can be configured similar to the OTD 500 shown in FIG. 5B. A camera on the HMD 400 can be programmed to look for the OTD 500, which is located on the wrist. More particularly, the camera on the HMD 400 can observe and track the call, calculating relative position of the OTD 500 (ball) to the HMD 400 using known computer vision techniques.

In certain embodiments, the WBD 715 includes a sound emitter. For example, the WBD 715 can be configured as the OTD 500 in FIG. 5A or the OTD 500 shown in FIG. 5B, in which one or more emitters emit a sound signal, such as an ultrasonic signal. The HMD 400 can include one or more sound receivers that detect and measure the sound signals emitted by the WBD 715. The HMD 400 the can calculate a relative position of the emitters with respect to a position to the HMD 400.

The OTD 500 (e.g., WBD) can now be used to measure changes in position. Since the hand held object 720, such as a 3DOF HHD 600, is used to measure changes in orientation, employing known inverse kinematics of the wrist-hand model, a 6DOF can be solved for the hand held object 720 based on the position measurement of the WBD 715. The OTD 500 can have active or passive markers (or trackers), such as the one or more sensors 515, that enable observation from the HMD 400, or other observation point.

Embodiments of the present disclosure provide a system that employs the coordination and digital coupling of the 3-DOF (orientation) HHD 720 and a 3-DOF(position) WBD 715. The hand held object 720 is configured to indicate, or measure, movement in 3DOF. That is, movement of the hand of the user is measured by the hand held object 720 within the 3DOF. For example, the hand held object 720 can indicate changes from a first position 750*a* to a second position 750*b*. Additionally, the wrist based device 715 also is configured to indicate, or measure, movement in 3DOF. For example, the wrist based device 715 can indicate changes from a first position 755*a* to a second position 755*b*. Therefore, movement from of the hand held object 720 is varied from: (1) the first position 750*a* to the second position 750*b*; to (2) the first position 750*a* to a third position 750*c*. Additionally, the hand held object 720 can experience greater acceleration and small bursts of speed with respect to the arm as it traverses from the first position 750*a* to the third position 750*c*.

Data from the wrist based device 715 and the hand held object 720 are provided to the HMD 400. Based on IK principles, the HMD 400 can calculate 6DOF for the hand held object 720, which includes both positional and rotational movement. In certain embodiments, the 6DOF calculation is performed by one of the OTD 500 or the HHD 600 and communicated to the HMD 400. The HMD 400, which typically is the point of observation, is able to acquire transform information from both the HHD 720 and WBD 715. In one illustrative example, orientation transforms from the HHD 720 can be acquired via a wireless communication. Additionally, transforms from the WBD 715 are observed based on sensors on the HMD 400. The relationship between the WBD and the HHD also is modeled. This modeling can be performed using inverse kinematics. The distance from the WBD 715 and HHD 720 can be estimated. For example, if the HHD 400 is placed twenty centimeters (cm) from the position of the WBD 715:

model.getTransform( ).setPosition(0.0f, 0.0f, 0.2f)     (1)

A precise distance between the HHD 720 and WBD 715 can be absolute if both devices are in some way physically connected to each other. Additionally, Calibration between timestamps of the HHD 720 and WBD 715 is performed. This can be performed a numbers of ways, such as by detecting duplicate actions or requesting that the user to perform one or more prescribed movements. Once timestamps have been resolved to a satisfactory level, the application layer is sent 6DOF transform data.

In certain embodiments, on the Operating System (OS) for the HMD 400, a service receives orientation 3-DOF (r,p,y) from the HHD and position 3-DOF (x,y,z) from the WBD 715. The HMD 400 adjusts received data if any adjustments in time, such as if one device has a greater lag than another device. An example code is illustrated below in which a simple two steps are utilized. Set Rotation, then set Position:

wristObject.getTransform( ).setRotation(rotationQuaternion.z, rotationQuaternion.y, rotationQuaternion.x, rotationQuaternion.w);

wristObject.getTransform( ).setPosition(poz_X, pos_Y, pos_Z);

Since the position transform for the wrist is 20 cm off from the rotation point, a more accurate model of hand verse forearm movements can be created. In the aforementioned examples, in a system with the WBD 715, HHD 720, and HMD 400, is able to model the wrist separate from the hand, which is something a stand-alone 6DOF system cannot do as well.

Embodiments of the present disclosure allow the user to implement a number of older 3DOF (position) devices with applications that take advantage of 6DOF information. Furthermore, when the WBD 715 is placed on the inner side of the wrist, tracking is improved because transformations are lower in magnitude then a traditional approach of placing a trackable element at the end of the HHD 720. Calculating the HHD 720 6DOF position is achieved by understanding the distance from the center of the HHD 720 to the WBD 715. Using simple IK rules, changes in the WBD 715 position are applied to the orientation transforms on the HHD 720. The result is a perceived 6DOF HHD by the user. In certain embodiments, performance can be improved by adding an inertial measurement unit (IMU) to the WBD 715 thus providing a 6DOF at the wrist position further refining the position and orientation of the HHD 720. Additionally, by physically connecting the WBD 715 and the HHD 720 either device can serve to provide power and communication with a HHD or other device.

Figure 8:
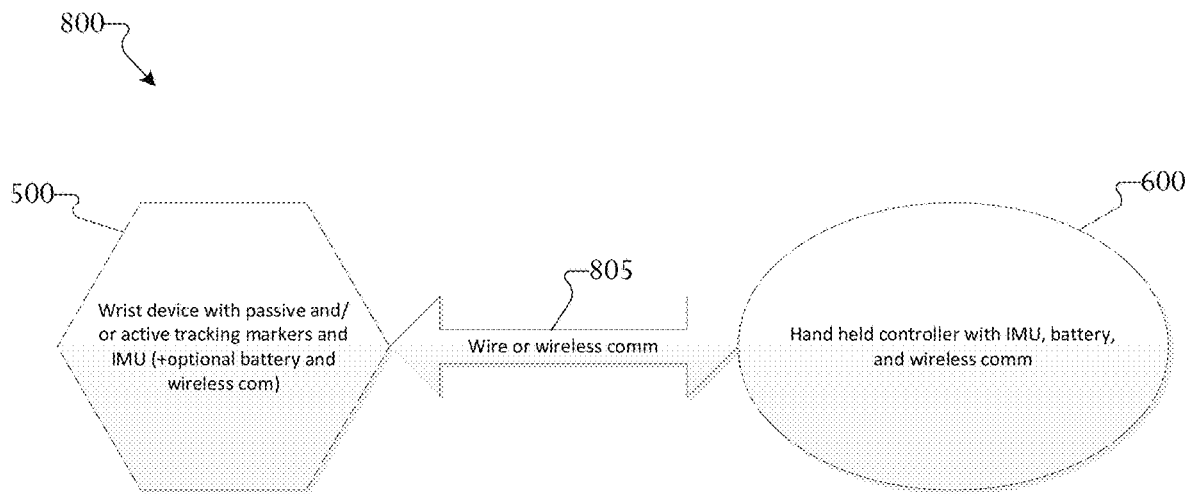
FIG. 8 illustrates a distributed tracking device coupling according to embodiments of the present disclosure.

FIG. 8 illustrates a distributed tracking device coupling according to embodiments of the present disclosure. The embodiment of the coupling 800 shown in FIG. 8 is for illustration only. Other embodiments could be used without departing from the scope of the present disclosure.

In certain embodiments, the OTD 500 is configured to couple to the HHD 600. For example, the OTD 500 can be coupled to the HHD 600 through a wired or wireless communication link 805. That is, the OTD 500 can be "paired" with the HHD 600 through a near-field wireless communication protocol, such as BLUETOOTH. The OTD 500 also can be tethered to the HHD 600 through a wired communication link or a physical non-communicative tether. Additionally, the OTD 500 can be paired, or in communication with, the HMD 400.

Figure 9:
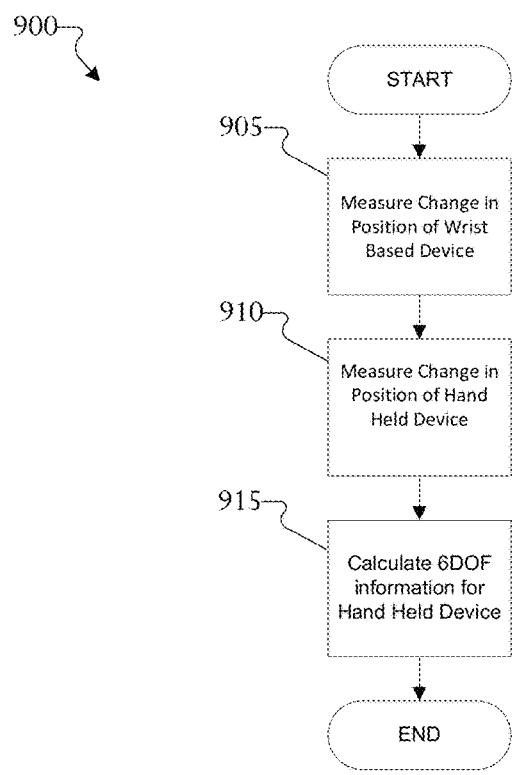
FIG. 9 illustrates a process for distributed device tracking according to embodiments of the present disclosure.

FIG. 9 illustrates a process for distributed device tracking according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processor in, for example, a head mounted electronic device.

In block 905, a change in position of a wrist based device is determined. For example, the OTD 500 can be coupled to a first body part, such as a wrist, of a user and indicate a first three-degree of freedom (3DOF) orientation information regarding the OTD 500. In certain embodiments, the HMD 400 identifies the first 3DOF orientation information regarding the first body part, such as the wrist, of the user based on signals detected from the OTD 500. The first 3DOF orientation information can further correspond to position or orientation information of the OTD 500. In certain embodiments, the OTD 500 is configured to calculate its own position or orientation information and generate the first 3DOF orientation information regarding the OTD 500. Thereafter, the OTD 500 can communicate the first 3DOF orientation information regarding the OTD 500 to the HMD 400. In certain embodiments, the OTD 500 communicates the first 3DOF orientation information regarding the OTD 500 to the HHD 600.

In block 910, a change in position of a hand held device is determined. For example, the HHD 600 can be coupled to, or held by, a hand of the user. In certain embodiments, the HMD 400 identifies a second 3DOF orientation information regarding the HHD 600 based on signals detected from the HHD 600. For example, the second 3DOF orientation information can include position, orientation, or changes in position or orientation, information of the HHD 600. In certain embodiments, the HHD 600 is configured to calculate its own position or orientation information and generate the second 3DOF orientation information regarding the HHD 600. Thereafter, the HHD 600 can communicate the second 3DOF orientation information regarding the HHD 600 to the HMD 400. In certain embodiments, the HHD 600 can communicate the second 3DOF orientation information regarding the HHD 600 to the OTD 500.

In block 910, a 6DOF change in position of the hand held device is determined. The HMD 400 is configured to utilize the first 3DOF orientation information regarding the OTD 500 and the second 3DOF orientation information regarding the HHD 600 to calculate 6DOF orientation information of the HHD 600. That is, the HMD 400 determines the 6DOF orientation information of the HHD 600 as a function of the first 3DOF orientation information and the second 3DOF orientation information, wherein the OTD 500 is coupled to a first body part that is different than the second body part to which the HHD 600 is coupled. In certain embodiments, the HMD 400 is able to detect motion of the OTD 500 or the HHD 600 based on signals emitted by the OTD 500 or the HHD 600. In certain embodiments, the HMD 400 receives a communication from the OTD 500 containing the first 3DOF orientation information, the second 3DOF orientation information, or both. In certain embodiments, the HMD 400 receives a communication from the HHD 600 containing the first 3DOF orientation information, the second 3DOF orientation information, or both.

A system employing the aforementioned HMD 400, OTD 500, and HHD 400 can be utilized to control or manipulate objects in a virtual environment. For example, the system can be utilized by a player, or both players each having their own system, to play a game such as "GO" in a virtual reality or augmented reality environment. Each player can select a virtual stone to place stones on the board, which may exist in a virtual environment as a virtual board or a real (non-virtual) world as the actual board. Each player may select their respective stones and move the stones through space and ultimate placement on the board as desired and in accordance with the rules of "GO". Alternatively, the two players can engage in a game of virtual chess in which each player can utilize their respective system to select virtual pieces for movement on a real or virtual chess board. The players can play other games such as games in which each player operates items in the game, such as weapons, golf clubs, baseballs, baseball bats, footballs, and the like. The players may be able to operate vehicles such as tanks, planes or the like. In other example, a user may interact with other virtual objects, such as interacting with an animal such as petting a domestic cat or other animal, fighting a bear or a tiger, and the like. In other example, a user can manipulate virtual objects that correspond to real world data such as the user turning pages on a calendar to view different appointments. The user may also select a pen or other writing instrument and write new appointments or messages on the calendar. A user may also open an email system and, using a virtual pen, write emails to one or more recipients. In certain embodiments, the user can create objects, such as building a block building or creating a painting.

Although various features have been shown in the figures and described above, various changes may be made to the figures. For example, the size, shape, arrangement, and layout of components shown in FIGS. 1 through 8 are for illustration only. Each component could have any suitable size, shape, and dimensions, and multiple components could have any suitable arrangement and layout. Also, various components in FIGS. 1 through 8 could be combined, further subdivided, or omitted and additional components could be added according to particular needs. Further, each component in a device or system could be implemented using any suitable structure(s) for performing the described function(s). In addition, while FIG. 9 illustrates various series of steps, various steps in FIG. 9 could overlap, occur in parallel, occur multiple times, or occur in a different order.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A device comprising:
    one or more tracking devices configured to obtain orientation information of at least two devices, wherein the orientation information comprises:
        a first three-degree of freedom (3DOF) orientation information regarding an orientation tracker device, and
        a second 3DOF orientation information regarding a first electronic device; and
    a processor configured to determine a six-degree of freedom (6DOF) orientation information of the first electronic device as a function of the first 3DOF orientation information and the second 3DOF orientation information, wherein the orientation tracker device is separate from the first electronic device.

2. The device of claim 1, wherein the one or more tracking devices comprise at least one of:
    an ultrasonic signal emitter configured to emit an ultrasonic signal;
    a magnetic field generator configured to generate a magnetic field; or
    an optical signal emitter configured to emit an optic signal.

3. The device of claim 1, wherein the one or more tracking devices comprise at least one of:
    an optical signal detector;
    an ultrasonic signal detector; or
    an magnetic field detector, and
    wherein the one or more tracking devices are configured to indicate at least one of the first 3DOF orientation information or the second 3DOF orientation information by detecting a signal or field emitted or generated by the orientation tracker device or the first electronic device.

4. The device of claim 1, wherein the orientation tracker device is coupled to a first body part of a user and the first electronic device is coupled to a second body part of the user, the second body part different than the first body part.

5. The device of claim 1, the orientation tracker device comprises:
a communication interface configured to couple with at least one of the first electronic device or the device.

6. The device of claim 5, wherein the one or more tracking devices comprises a transceiver configured to at least one of:
receive orientation information,
receive the 6DOF orientation information from the orientation tracker device, or
receive the first electronic device,
wherein the 6DOF information comprising the first 3DOF orientation information regarding the orientation tracker device and the second 3DOF orientation information regarding the first electronic device.

7. The device of claim 1, wherein the orientation tracker device comprises at least one of:
a wrist tracker, a watch, a wearable device, or a fitness tracking device, and
wherein the first electronic device comprises a 3DOF controller.

8. A method comprising:
identifying orientation information of at least two devices by:
identifying, a first three-degree of freedom (3DOF) orientation information regarding an orientation tracker device,
identifying a second 3DOF orientation information regarding a first electronic device; and
determining a six-degree of freedom (6DOF) orientation information of the first electronic device as a function of the first 3DOF orientation information and the second 3DOF orientation information, wherein the orientation tracker device is separate from the first electronic device.

9. The method of claim 8, wherein identifying the first 3DOF orientation information comprises detecting one or more of an ultrasonic signal, an optical signal, or a magnetic field.

10. The method of claim 8, wherein identifying the first 3DOF orientation information comprises generating one or more of an ultrasonic signal, an optical signal, or a magnetic field.

11. The method of claim 8, further comprising:
coupling the orientation tracker device with at least one of the first electronic device or a second electronic device.

12. The method of claim 10, further comprising receiving the 6DOF orientation information from at least one of the orientation tracker device or the first electronic device, the 6DOF orientation information comprising the first 3DOF information regarding the orientation tracker device and the second 3DOF orientation information regarding to the first electronic device.

13. The method of claim 8, wherein the orientation tracker device comprises at least one of:
a wrist tracker, a watch, a wearable device, or a fitness tracking device, and wherein the first electronic device comprises a 3DOF controller.

14. A non-transitory computer readable medium comprising a plurality of instructions that, when executed by a processor in a head mounted display (HMD), is configured to cause the processor to:
obtain orientation information of at least two devices by:
obtaining, from an orientation tracker device, a first three-degree of freedom (3DOF) orientation information regarding the orientation tracker device,
obtaining, from a first electronic device, a second 3DOF orientation information regarding the first electronic device; and
determine a six-degree of freedom (6DOF) orientation information of the first electronic device as a function of the first 3DOF orientation information and the second 3DOF orientation information, wherein the orientation tracker device is separate from the first electronic device.

15. The non-transitory computer readable medium of claim 14, wherein the plurality of instructions are configured to cause the processor to obtain the first 3DOF orientation information by detecting one or more of an ultrasonic signal, an optical signal, or a magnetic field.

16. The non-transitory computer readable medium of claim 14, wherein the plurality of instructions are configured to cause the processor to obtain the first 3DOF orientation information by generating one or more of an ultrasonic signal, an optical signal, or a magnetic field and receiving a measurement value or indication from the orientation tracker device.

17. The non-transitory computer readable medium of claim 14, wherein the orientation tracker device is coupled to a first body part and is communicatively coupled with at least one of a first electronic device or a second electronic device.

18. The non-transitory computer readable medium of claim 17, wherein the plurality of instructions are configured to cause the processor to obtain the orientation information by receiving the 6DOF orientation information, the 6DOF orientation information comprising the first 3DOF information regarding the orientation tracker device and the second 3DOF orientation information regarding to the first electronic device.

19. The non-transitory computer readable medium of claim 14, wherein the orientation tracker device comprises at least one of:
a wrist tracker, a watch, a wearable device, or a fitness tracking device, and wherein the first electronic device comprises a 3DOF controller.

20. A device comprising:
a mount configured to couple the device to a first body part of a user; and
an orientation tracker configured to indicate six-degree of freedom (6DOF) orientation information of a first electronic device, the orientation tracker comprising one or more tracking devices configured to identify a three-degree of freedom (3DOF) orientation of two devices,
wherein the 6DOF orientation information comprises:
a first three-degree of freedom (3DOF) orientation information regarding the device, and
a second 3DOF orientation information regarding the first electronic device,
wherein the 6DOF orientation information is determined as a function of the first 3DOF orientation information and the second 3DOF orientation information, and wherein the device is separate from the first electronic device.

* * * * *